United States Patent [19]
Barth et al.

[11] 3,800,653
[45] Apr. 2, 1974

[54] METAL PENETRATING STAPLE

[75] Inventors: Gerald Dean Barth, Dundee; Ralph Ernest Jennings, Glen Ellyn, both of Ill.

[73] Assignee: Illinois Tool Works Inc., Chicago, Ill.

[22] Filed: Feb. 29, 1972

[21] Appl. No.: 230,365

[52] U.S. Cl. .................................. 85/13, 85/49
[51] Int. Cl. ............................. F16b 15/04
[58] Field of Search ............... 85/49.11, 13, 30, 31

[56] References Cited
UNITED STATES PATENTS

| | | | |
|---|---|---|---|
| 308,837 | 12/1884 | Frost | 85/13 |
| 2,550,060 | 4/1951 | Gisondi | 85/13 |
| 3,236,142 | 2/1966 | Bradway | 85/49 |
| 3,511,127 | 5/1970 | Gisondi | 85/11 |
| 3,645,163 | 2/1972 | Byland | 85/13 |

FOREIGN PATENTS OR APPLICATIONS 931,930  11/1947  France ..................... 85/31

Primary Examiner—Edward C. Allen
Attorney, Agent, or Firm—Robert W. Beart; Thomas W. Buckman

[57] ABSTRACT

A metal penetrating staple formed from a resilient sheet stock material and which has entering points, each including a pair of camming surfaces of dissimilar lengths. One longitudinal edge of each leg of the staple includes locking means which cooperate with the longest camming surface to produce a spring-like lock beneath a metal plate after the staple has penetrated the plate.

9 Claims, 11 Drawing Figures

PATENTED APR 2 1974 3,800,653

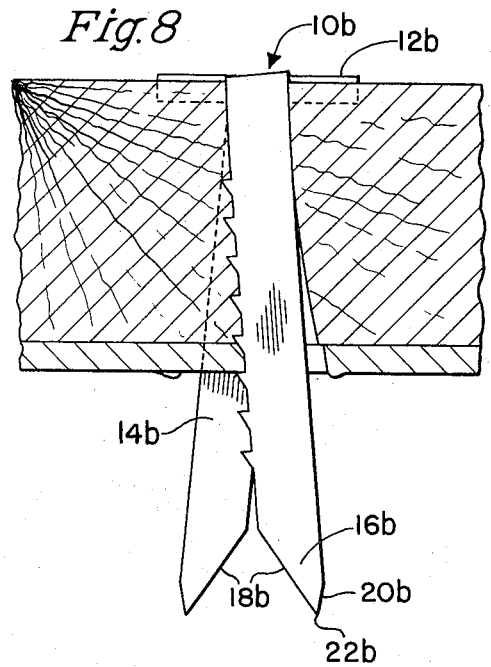
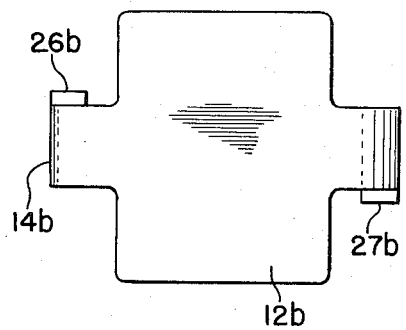
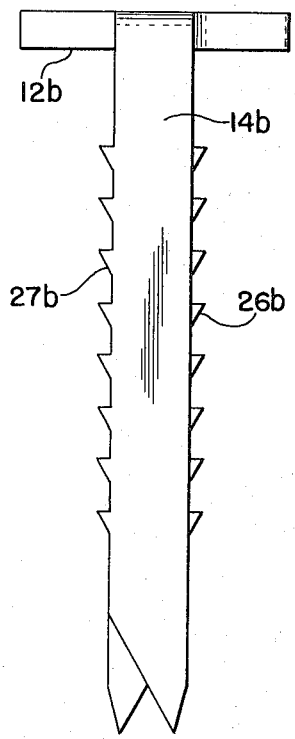
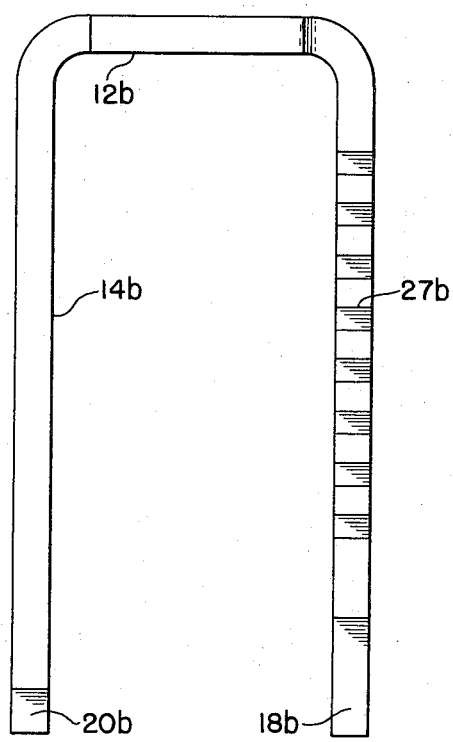

METAL PENETRATING STAPLE

This invention relates to staples and is more particularly concerned with a staple which is particularly designed for use in fastening a plurality of workpieces, one of which is sheet metal.

The use of composite structures, such as wood or fibrous material and sheet metal, has presented a number of problems relating to the fastening systems which can be used to attach such workpieces together. Large scale applications of such composite structures require a fastener which may be secured rapidly with a minimum amount of preparation. Therefore, conventional systems, such as bolts and rivets, are cumbersome and uneconomical. Nailing systems or power actuated stud systems may be utilized in fastening such structures; however, certain environments require a fastening system which will remain secured under certain adverse conditions, such as vibration and impact. Conventional studs and nailing systems will not perform well in such adverse conditions. One example of such an environment would be construction used in a truck trailer.

Conventional staples normally cannot be used to fasten sheet metal in such environments because they generally lack the structural strength to penetrate the metal. While certain staples may have such structural strength, they are designed in such a manner as to require high energy forces to drive them through the metal and do not perform well in the above mentioned adverse conditions.

Accordingly, it is an object of this invention to provide a strong, resilient staple which will penetrate metal.

Another object of this invention is to provide a metal penetrating staple which is formed from spring-like material, the spring-like material cooperating with locking means on the legs of the staple to snap the staple in locking position when it is driven through the metal.

Yet another object of this invention is the provision of camming surfaces on entering points of the staple which force the legs to diverge against the bias of the spring-like material to permit a locking means to snap beneath a metal plate to securely anchor the staple against forces tending to loosen the connection.

Still another object of the invention is to provide a staple formed from a sheet stock material which is particular adapted to fasten wood to metal and which resists the tendency of the wood to pull out from underneath the head of such a staple.

These objects of the invention and other features are obtained by a staple which is formed from a sheet material and hardened to give the staple a spring-like resilience and which includes a relatively long camming surface on the same longitudinal edge as a ratchet-like locking means. The cooperation of the longer camming surface with the locking means allows the legs to at least temporarily diverge as they are driven through the workpiece and then snap back into their original position with the locking means positioned beneath the workpiece.

The invention will be described in detail with reference to the accompanying drawings forming a part of the specification and in which FIG. 1 is a perspective view of one form of the staple after it has been driven through a composite wood and metal workpiece.

FIG. 8 is a fragmentary cross-sectional view of a composite workpiece fastened by yet another form of the staple.

FIG. 9 is a top plan view of the staple shown in FIG. 8.

FIG. 10 is a side elevation view of the staple shown in FIG. 8.

FIG. 11 is a front elevation view of the staple shown in FIG. 8.

Figure 1:
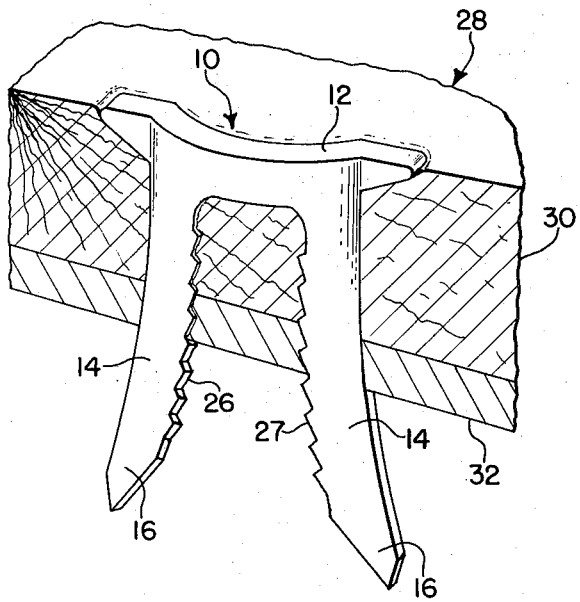
Figure 2:
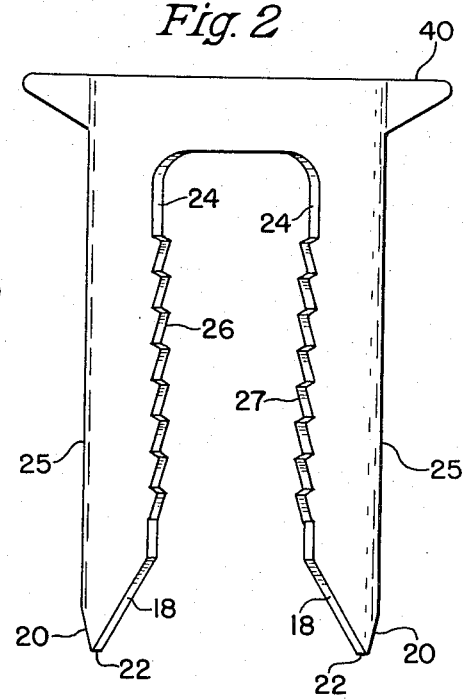
FIG. 2 is a front elevation view of the staple in FIG. 1
Figure 3:
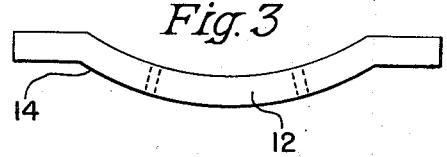
FIG. 3 is a top plan view of the staple in FIG. 2.
Figure 6:
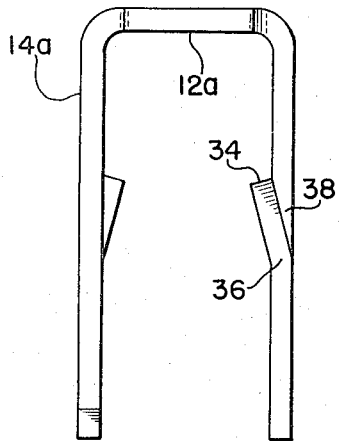
FIG. 6 is a front elevation view of the staple shown in FIG. 4.
Figure 7:
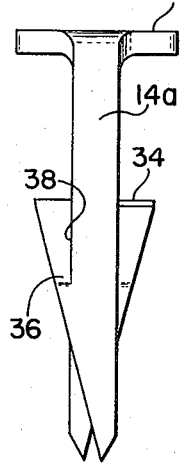
FIG. 7 is a side elevation view of the staple shown in FIG. 4.

Referring to FIGS. 1–3, it will be seen that staple 10, which can be economically stamped from sheet metal stock, includes a crown 12 and a pair of legs 14 with entering points 16. The use of thin stamped material serves to reduce the driving energy necessary to penetrate a metal workpiece. For purposes which will be apparent later, each entering point includes a pair of camming surfaces 18 and 20 which are of dissimilar lengths. One longitudinal edge 24 on each leg includes teeth or lock means 26 and 27. The longest camming surface 18 is associated with this longitudinal edge 24.

FIG. 3 illustrates the generally arcuate cross-sectional configuration of staple 10. This embodiment of the invention enables the staple to be used with wood workpieces, such as 30 in FIG. 1, and reduces the tendency of such a fastener to split the wood when it is driven in the wood.

The unique configuration of the entering point 16 in conjunction with the ratchet-like locking teeth 26 and 27 allows the staple to be particularly effective to penetrate through metal, such as workpiece 32 in FIG. 1. It has been found to be particularly advantageous to work harden the staple and give it a spring-like characteristic. As the staple 10 is driven through a metal workpiece 32, the long camming surfaces 18 tend to force the legs apart as in FIG. 1. When the staple reaches its desired penetration through the metal, the elastic memory of the legs will force the legs to tend to return to the original position, such as that in FIG. 2. This springback of the legs in conjunction with the teeth located on the inner edges 24 of the staple provides a positive ratchet-like lock for the fastening system.

It should be noted that the double camming surfaces 18 and 20 are particularly important in the penetration of metal. The provision of surface 20 extending from apex 22 to the outer longitudinal edge 25 provides a sound structural backing for the point to enable it to effectively penetrate the metal. It is particularly advantageous to offset the apex 22 from the center line of the leg. Without such an offset, the point may be too blunt to penetrate the metal and still provide the proper camming features. It has been found that an apex having an included angle of about 45° with the short camming surface extending about 30° to the longitudinal axis and the long camming surface extending about 15° to the longitudinal axis will effectively penetrate the metal workpiece.

The placement of legs 14 at an angle to each other, as a result of the curvature of the crown 12, allows the divergence of the legs to be greater. This is due to the fact that the bending or divergence of the legs will occur, at least partially, out of the plane of the legs.

The provision of ears 40 serves to increase the surface contact area for the head of the staple which decreases the possibility that the wood will pull out from under the head of the staple.

Figure 5:
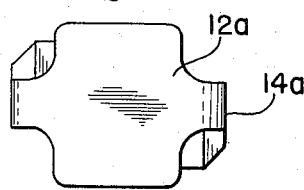
FIG. 5 is a top plan view of the staple shown in FIG. 4.
Figure 4:
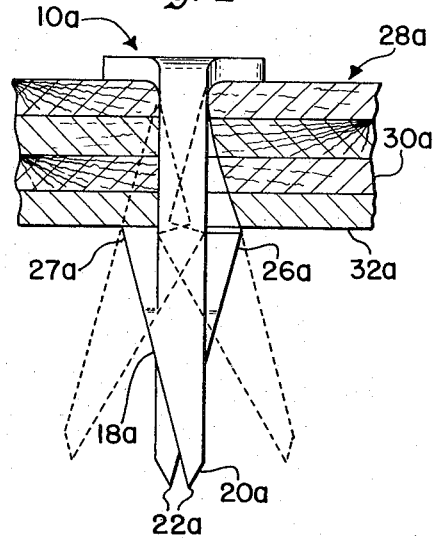
FIG. 4 is a fragmentary cross-sectional view of another form of the staple associated with a composite wood and metal workpiece and which shows the staple in its full divergent position and lock position.

FIGS. 4-5 illustrate a second embodiment of the invention. The staple 10a includes long camming surfaces 18a and shorter camming surfaces 20a on each leg. This staple also includes an enlarged head or crown area 12a which is extremely helpful in retaining the wood and preventing the wood from pulling out from beneath the head. This embodiment of the invention is shown with a laminated structure including wood layers 28a and 30a as well as a metal sheet 32a.

In operation, staple 10a performs in a manner similar to the staple described in FIGS. 1-3. As the legs 14a penetrate the metal 32a, the longer camming surface forces the legs to diverge in a scissor-like fashion as shown in dotted lines in FIG. 4. When the staple has penetrated a predetermined depth, which is generally determined by the abutment of head 12a on the uppermost panel 28a, the spring-like legs tend to return to their original positions. In this embodiment, a single tooth is formed from the camming surface 18a and a shelf-like portion 34. The shelf portion 34 extends generally perpendicular to the longitudinal edge of the leg and is positioned intermediate the apex 22a and the head 12a. The thickness of the laminated workpiece may determine the exact distance of shelf 34 from the head 12a.

Staple 10a may also provide a locking surface in a plane perpendicular to the plane of the legs, as well as in a plane generally parallel to or coincident with the plane of the legs. This is accomplished by biasing the tooth 26a out of the plane of the legs. This secondary locking structure may be accomplished by a slit 38 and a hinge-like portion 36 connecting the teeth 26a or 27a to the leg 14a.

FIGS. 8-11 show a further embodiment of the invention wherein staple 10b is similar to the staple 10a except that one longitudinal edge of each leg is provided with a plurality of ratchet-like teeth 26b or 27b. This staple should also be hardened to give the legs the proper spring-like bias which enables the ratchet-like teeth 26b or 27b to snap back and lock beneath the metal panel.

Thus it is apparent that there has now been provided a staple which is particularly adapted to penetrate through a sheet metal workpiece and be lockingly retained in such a workpiece. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

We claim:

1. A metal-penetrating staple formed from sheet stock material with uniform thickness and including a crown portion having a lateral extent and a width and a pair of generally flat legs extending from each extremity of the lateral extent and generally perpendicular thereto, the legs having a width substantially greater than the thickness of the stock, the juncture point of the legs and the crown having a width substantially that of the width of the associated leg and being substantially uninterrupted at the edges thereof to provide a stiff resilient hinge about which the legs may pivot in the plane of the width of the legs, the legs each including an entering point formed from a pair of terminal edges converging from the longitudinal edges of the flat legs, each pair of terminal edges including a longer edge and a shorter edge intersecting at an apex on each leg, one edge of each leg including means for locking the staple in an associated workpiece, the longest terminal edge of the entering point being located on the same longitudinal edge of the leg on which the locking means is located and forming a camming surface on said leg, the apex of the point being offset from a longitudinal axis located midway of the width of each leg and on the opposite side of the longitudinal axis from the side including the longer terminal edge each terminal edge on each leg extending at an acute angle to the longitudinal axis, the generally flat legs lying in spaced parallel planes essentially a distance equal to the lateral extent of the crown and adapted to at least partially rotate in opposite directions within their associated planes upon the interaction of the camming surface with an associated metal workpiece, the staple being formed of a resilient material which enables the locking means to spring back to the original positions of the legs and into locking position with an associated workpiece when the staple is driven through a metal workpiece.

2. A metal-penetrating staple in accordance with claim 1 wherein the locking means include at least one tooth which extends outward from the longitudinal edge of the associated leg and also extends at an angle to the plane including the longitudinal edges of the legs.

3. A metal-penetrating staple in accordance with claim 1 wherein the longest terminal edge of each entering point extends to a position intermediate the extremities of the legs, said terminal edge intersecting with a shelf surface extending outwardly from the edge of the leg, the long terminal edge and ledge surface forming at least part of the locking means for each leg.

4. A metal-penetrating staple in accordance with claim 1 wherein the locking means include a plurality of teeth extending from the one longitudinal edge of each leg.

5. A metal-penetrating staple in accordance with claim 1 wherein the terminal edges intersect at an apex having an included angle of about 45°, the short terminal edge extending about 30° to the longitudinal axis of the leg and the long terminal edge extending about 15° to the longitudinal axis of the leg.

6. A metal-penetrating staple in accordance with claim 1 wherein the locking means of each leg are adapted to resiliently deflect in two generally perpendicular directions.

7. A metal-penetrating staple in accordance with claim 1 wherein the locking means include a camming edge and a shelf edge, the shelf edge extending generally perpendicular to the longitudinal edge of the leg and is separated from the longitudinal edge to allow the shelf edge to flex transverse of the plane of the generally flat legs.

8. A metal-penetrating staple in accordance with claim 1 wherein the locking means include a plurality of teeth located along the longitudinal edge of the leg.

9. A metal-penetrating staple in accordance with claim 1, wherein the apex angle of the entering point generally does not exceed 45° and the angle which each terminal edge extends to a longitudinal axis generally does not exceed 30°.

* * * * *